United States Patent [19]

Mole et al.

[11] Patent Number: 5,057,726

[45] Date of Patent: Oct. 15, 1991

[54] STRUCTUREBORNE VIBRATION-COMPENSATED MOTOR ARRANGEMENT HAVING BACK-TO-BACK TWIN AC MOTORS

[75] Inventors: Cecil J. Mole, Monroeville; Dexter V. Wright, Pittsburgh, both of Pa.

[73] Assignee: Westinghouse Electric Corp., Pittsburgh, Pa.

[21] Appl. No.: 597,943

[22] Filed: Oct. 10, 1990

[51] Int. Cl.$^5$ ............................................. H02K 16/00
[52] U.S. Cl. ................................. 310/67 R; 310/114; 310/51; 310/259; 310/112; 440/52; 74/574
[58] Field of Search ............... 310/67 R, 89, 114, 263, 310/265, 269, 273, 51, 75 D, 259, 112; 440/52, 76, 111, 900; 74/574

[56] References Cited

U.S. PATENT DOCUMENTS

| | | | |
|---|---|---|---|
| 3,226,579 | 12/1965 | Bygdnes | 310/51 |
| 4,012,653 | 3/1977 | Shigeta et al. | 310/217 |
| 4,563,604 | 1/1986 | Xuan | 310/114 |
| 4,600,863 | 7/1986 | Chaplin et al. | 318/114 |
| 4,606,707 | 8/1986 | Kumata | 310/67 R |
| 4,661,735 | 4/1987 | Miki et al. | 310/112 |
| 4,803,390 | 2/1989 | Bertram et al. | 310/112 |
| 4,959,578 | 9/1990 | Varga | 310/268 |

FOREIGN PATENT DOCUMENTS 912238  5/1954  Fed. Rep. of Germany ...... 310/112
626471  8/1978  U.S.S.R. ............................ 310/112

Primary Examiner—Steven L. Stephan
Assistant Examiner—Edward H. To

[57] ABSTRACT

A structureborne vibration-compensated motor arrangement includes a pair of twin AC motors supported by a rotatable shaft structure and a stationary outer housing. Each motor includes an annular stator core structure and an annular rotor field structure. The stator core structure is mounted by an annular stator support member which, in turn, is stationarily supported by the outer housing. The rotor field structure is mounted by an annular rotor support member in spaced relation, either axially or radially, from stator core structure. The rotor support member, in turn, is mounted to the rotatable shaft structure for rotation therewith. The twin AC motors are mounted with the stator core structures located adjacent opposite sides of the stator support member and the rotor field structures located adjacent the respective stator core structures opposite from the stator support member such that the twin AC motors are arranged back-to-back as mirror images of one another for cancelling out axial and radial vibrations of the stator core and rotor field structures at respectively the outer housing an shaft structure. Additionally, the respective stator and rotor support members are mounted by yieldably resilient members which isolate torsional vibration of the stator core and rotor field structures respectively from the other housing and shaft structure.

18 Claims, 4 Drawing Sheets

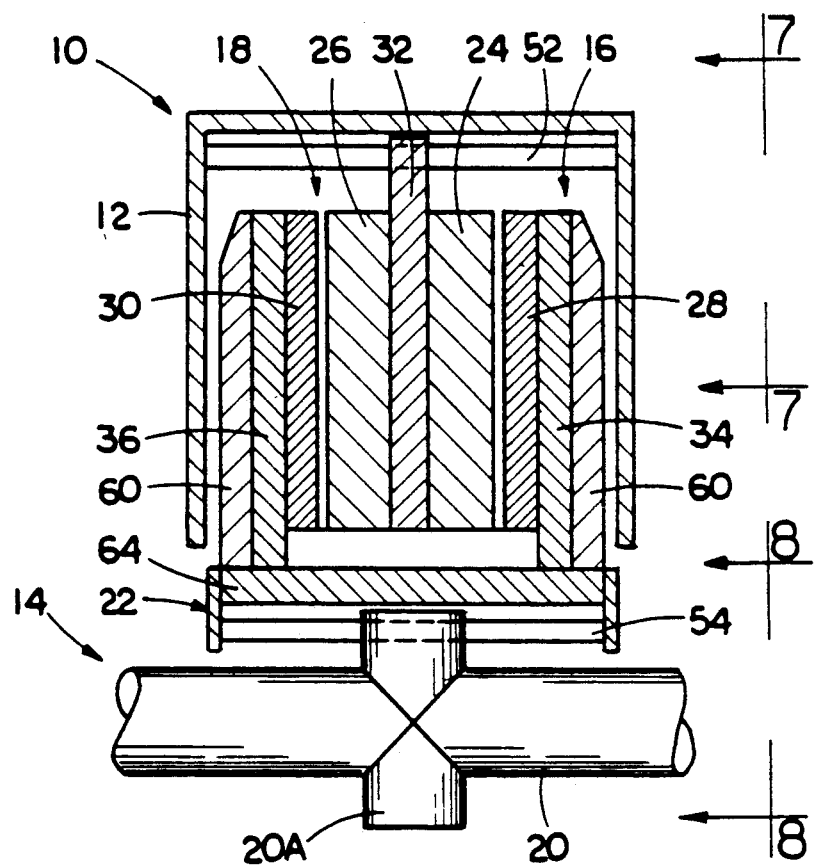
FIG. 6
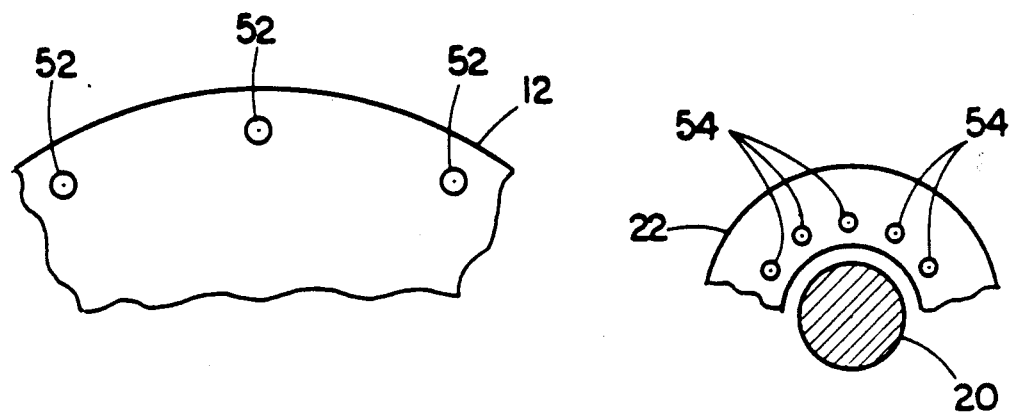
FIG. 7
FIG. 8

STRUCTUREBORNE VIBRATION-COMPENSATED MOTOR ARRANGEMENT HAVING BACK-TO-BACK TWIN AC MOTORS

BACKGROUND OF THE INVENTION

1. Field of the Invention

The present invention relates generally to mechanical vibration reduction and, more particularly, is concerned with a structureborne vibration-compensated motor arrangement having back-to-back twin AC motors.

2. Description of the Prior Art

Numerous potential benefits would stem from the utilization of electric motor propulsion systems for naval surface ships and submarines instead of turbine engine propulsion systems as used up to the present time. AC motors, particularly synchronous types, are simple and reliable.

However, AC motors are generators of variable frequency structureborne vibrations (or noise) which are difficult to damp and attenuate. It is extremely difficult to greatly reduce the structureborne vibrations over a wide frequency range. This basic problem has been a main factor preventing the use of AC propulsion systems for submarines.

The structureborne vibrations caused by AC motor operation result from summation of the electromagnetic forces in conductors and magnetic forces in the magnetic stator core, in space and time. The vibrations appear at the structural interfaces at the outer periphery of the stator core and at the shaft of the AC motor. Sophisticated structural systems which absorb and damp structureborne vibrations over a wide frequency range are required in the stator core support system and at shaft bearings. The vibrations are also transmitted along the propulsion shaft to the ship's propellers, requiring special attenuators to minimize this transmission.

Future naval ships and submarines will require major reductions in structureborne and acoustic vibrations, since detection systems are becoming more sensitive and discriminating. The attenuation and damping of structureborne vibrations is receiving considerable attention. Emphasis is being placed on active vibration damping systems which sense the mechanical forces and apply equal and opposite counter forces at discrete locations on the structures.

However, complete elimination of structureborne vibrations by this approach requires perfect detection and cancellation of the forces at these locations. Consequently, a need exists for a different approach to reducing structureborne vibrations.

SUMMARY OF THE INVENTION

The present invention provides structureborne vibration-compensated motor arrangement designed to satisfy the aforementioned need. The approach of the present invention to reducing structureborne vibrations is the provision of a motor arrangement which includes a pair of symmetrical, axial or radial gap, twin AC motors, mounted back-to-back, and constructed as mirror images of one another.

Annular stator core structures of the twin AC motors are placed precisely adjacent to one another on opposite sides of an annular stator support member mounted to an outer support housing of the motor arrangement. The stator core structures are precisely matched as electrical devices in space and time. The axial vibrations are thus exactly the same in each stator core structure and are cancelled out by the other adjacent stator core structure.

In the same way, annular rotor field structures of the twin AC motors are supported by annular rotor support members of the motor arrangement being mounted on a common rotatable shaft structure of the motor arrangement. Thus, the axial vibrations of the rotor field structures are also cancelled out in the same way as the stator vibrations except at the shaft structure mounting the rotor support structures to the shaft. The radial vibrations of the stator and rotor structures would also be very small at the housing and shaft structure.

Additionally, in the motor arrangement, the respective annular stator support member and rotor support members are supported by first and second yieldably resilient means which isolate torsional vibrations of the stator core and rotor field structures respectively from the outer housing and shaft structures of the motor arrangement. In a first embodiment, the first and second means are pluralities of yieldably resilient spring bars respectively supporting the annular stator support member on the outer support housing and the annular rotor support members on the shaft structure so as to isolate torsional vibrations of the stator core and rotor field structures respectively from the outer support housing and shaft structure. In a second embodiment, the first and second means are yieldably resilient bushings respectively supporting the annular stator support member on the outer support housing and the annular rotor support members on the shaft structure so as to isolate torsional vibrations of the stator core and rotor field structures respectively from the outer support housing and shaft structure.

These and other features and advantages of the present invention will become apparent to those skilled in the art upon a reading of the following detailed description when taken in conjunction with the drawings wherein there is shown and described an illustrative embodiment of the invention.

BRIEF DESCRIPTION OF THE DRAWINGS

In the course of the following detailed description, reference will be made to the attached drawings in which:

FIG. 6 is a schematical view of the motor arrangement of FIG. 1 with yieldably resilient spring bars isolating torsional vibrations of the stator core and rotor field structures from the outer support housing and the shaft structure of the motor arrangement.

FIG. 7 is a fragmentary side elevational view of the motor arrangement as seen along line 7—7 of FIG. 6.

FIG. 8 is a fragmentary side elevational view of the motor arrangement as seen along line 8—8 of FIG. 6.

DETAILED DESCRIPTION OF THE INVENTION

Figure 1:
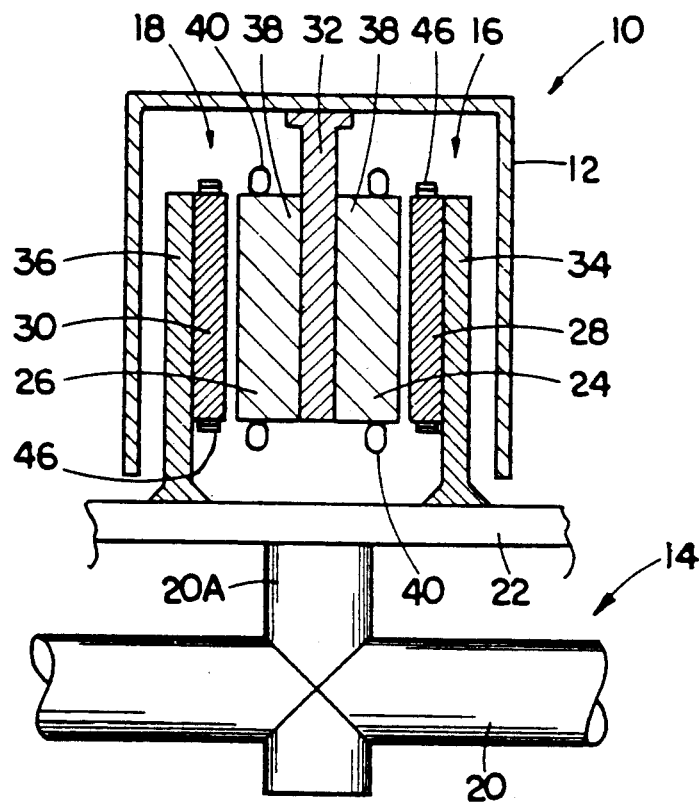
FIG. 1 is a fragmentary cross-sectional view of a structureborne vibration-compensated motor arrangement of the present invention having back-to-back twin AC motors arranged to cancel out axial and radial vibration forces.

In the following description, like reference characters designate like or corresponding parts throughout the several views of the drawings. Also in the following description, it is to be understood that such terms as "forward", "rearward", "left", "right", "upwardly", "downwardly", and the like, are words of convenience and are not to be construed as limiting terms.

Referring now to the drawings, and particularly to FIGS. 1-4, there is shown one embodiment of a structureborne vibration-compensated motor arrangement, generally designated 10, of the present invention. The motor arrangement 10 basically includes an outer support housing 12, a rotatable shaft structure 14, and a pair of right and left twin AC motors 16 and 18. The shaft structure 14 is composed of a central shaft 20 and an annular hub 22 fixedly attached on and about an annular flange 20A projecting outwardly from and about the central shaft 20 for rotation therewith.

Figure 2:
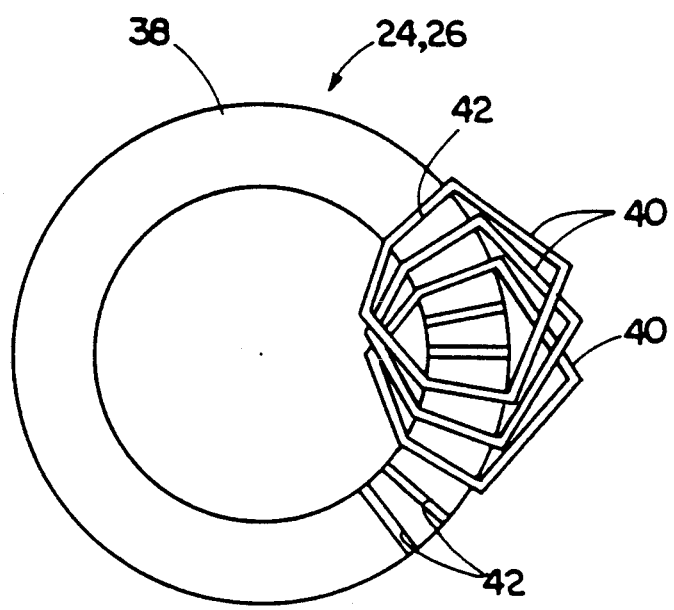
FIG. 2 is a side elevational view of an annular stator core structure of each of the twin AC motors of the motor arrangement of FIG. 1.
Figure 4:
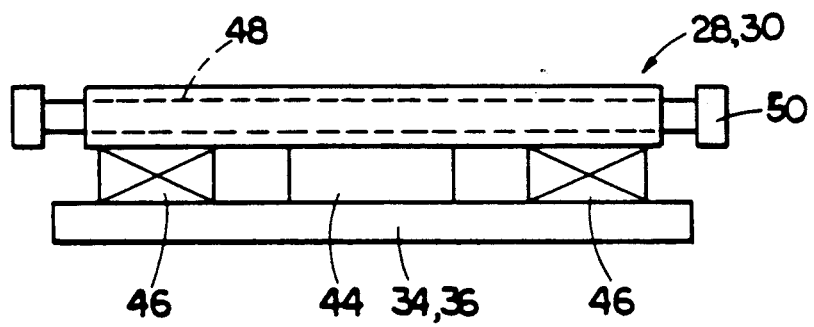
FIG. 4 is an enlarged cross-sectional view of the rotor field structure taken along line 4—4 of FIG. 3.
Figure 3:
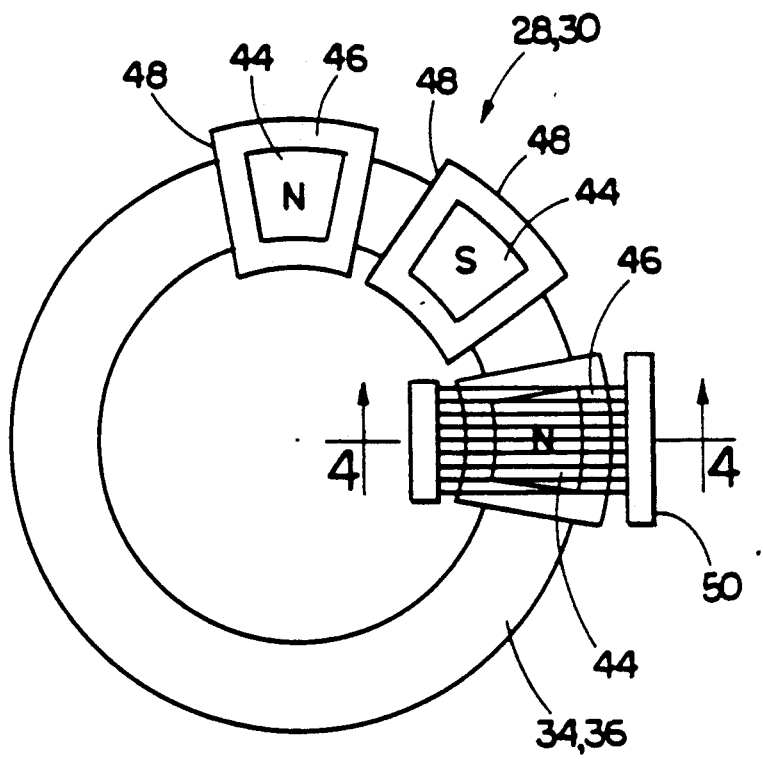
FIG. 3 is a side elevational view of an annular rotor field structure of each of the twin AC motors of the motor arrangement of FIG. 1.
Figure 9:
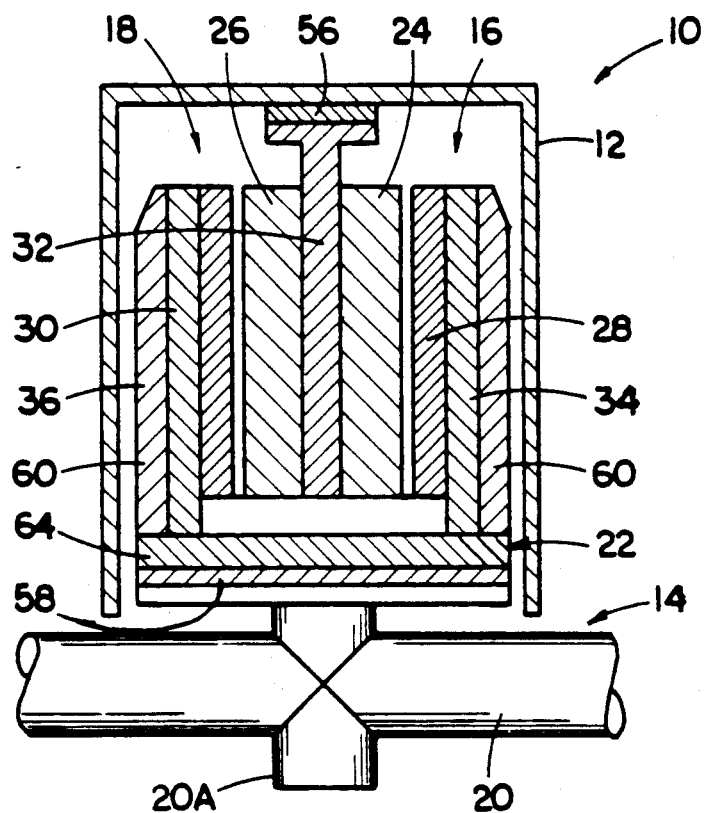
FIG. 9 is a schematical view of the motor arrangement of FIG. 1 with yieldably resilient bushings isolating torsional vibrations of the stator core and rotor field structures from the outer support housing and the shaft structure of the motor arrangement.

More particularly, the right and left twin AC motors 16 and 18 include right and left annular stator core structures 24 and 26, as best seen in FIG. 2, and right and left annular rotor field structures 28 and 30, as best seen in FIGS. 3 and 4. The right and left stator core structures 24, 26 are mounted by a central annular stator support member 32 which, in turn, is stationarily attached to the outer support housing 12. The right and left annular rotor field structures 28, 30 are mounted respectively in spaced relation from the right and left stator core structures 24, 26 by right and left annular rotor support members 34 and 36 at opposite right and left ends of the twin AC motors 16, 18. The right and left rotor support members 34, 36, in turn, are fixedly mounted to the annular hub 22 of the rotatable shaft structure 14 for rotation therewith such that the right and left rotor field structures 28, 30 rotate relative to the right and left stator core structures 24, 26.

Thus, the right and left twin AC motors 16, 18 of the motor arrangement 10 are mounted with their right and left stator core structures 24, 26 located at a pair of opposite sides of the central stator support member 32 and the right and left rotor field structures 28, 30 are spaced from and located adjacent the respective stator core structures 24, 26, opposite from the central stator support member 32, such that the right and left twin AC motors 16, 18 are arranged back-to-back as mirror images of one another for cancelling out axial and radial vibrations at the outer support housing 12 and the shaft structure 14.

The housing 12 may be connected to a ship or submarine main structure. The stator support member 32 may be composed of metal, or a combination of metal plates, composites and polymer liners to damp and absorb any axial and radial vibrations not cancelled out. The stator core structures 24, 26, as seen in FIG. 2, are precisely mounted in near-perfect symmetry to ensure that the structureborne vibrations in time and space are near-perfect mirror images and will therefore cancel out. The stator core structures 24, 26 include an annular core ring 38 and windings 40 precisely placed in slots 42 formed in the core ring 38 and connected in parallel to a common power source (not shown).

Referring to FIGS. 3 and 4, the rotor field structures 28, 30 are mounted to the common hub 22 with precise symmetry in the same way as the stator core rings 38. The rotor field structures 28, 30 have pole bodies 44 with field windings 46 around them. The pole bodies 44 and pole shoes 48 are mounted by the support members 34, 36 and can be constructed using magnetic iron laminations, with a copper or copper alloy damping winding 50 wound in the pole shoe 48. The damping winding 50 may be localized in the pole area or be connected into a continuous circumferential winding. The number of poles is determined by the required motor speed and the supply signal frequency. The damping winding 50 could also be used as an induction motor starting winding for a direct drive system. The axial and radial vibrations in the rotor field structures 28, 30 will be cancelled out at the hub interface, where the rotor support members 34, 36 are connected to the hub 22. The field windings 46 are also excited from a common power source (not shown).

Figure 5:
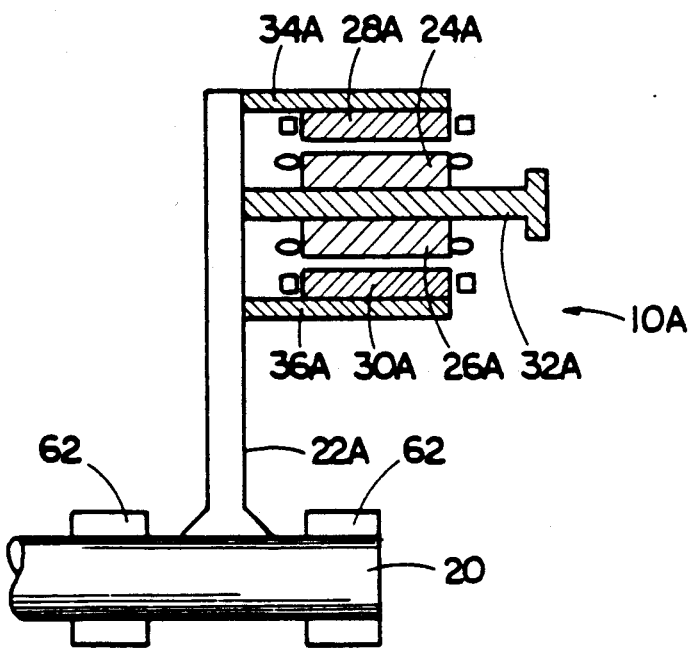
FIG. 5 is a fragmentary cross-sectional view of an alternative embodiment of the back-to-back twin AC motors of the motor arrangement of the present invention.

In the motor arrangement 10 of the first embodiment of FIG. 1, the right and left rotor field structures 28, 30 are spaced axially from the respective right and left stator core structures 24, 26. In a second, alternative embodiment of the motor arrangement 10A in FIG. 5, the outer and inner rotor field structures 28A, 30A are spaced radially from the respective outer and inner stator core structures 24A, 26A. In the alternative embodiment of FIG. 5, the hub 22A is arranged substantially perpendicular to the shaft 20 instead of substantially parallel as in first embodiment of FIG. 1. Also, bearings 62 are shown in this figure for supporting shaft 20 and it is to be understood that similar bearings (not shown) would support the shaft 20 shown in the other embodiments.

The back-to-back twin AC motor arrangement 10 will essentially eliminate the axial and radial vibrations generated by the motors at the outer housing 12 and the hub 22, as previously discussed. However, vibratory torques would still act at both housing and hub interfaces, causing substantial structureborne torsional vibrations. To avoid this, torsional vibration isolation is provided in these regions.

Thus, in the motor arrangement 10, the respective stator support member 32 and rotor support members 34, 36 are mounted respectively to the outer housing 12 and the shaft structure hub 22 by first and second yieldably resilient means which isolate torsional vibration of the stator core structures 24, 26 and rotor field structures 28, 30 respectively from the outer housing and shaft. In a first embodiment shown in FIG. 6, the first and second means are first and second pluralities of yieldably resilient spring bars 52, 54 extending generally parallel to the shaft 20 and supporting the stator support member 32 and rotor support members 34, 36 via hub 22 respectively on the outer support housing 12 and shaft structure 14. Here, the hub 22 includes the spring bars 54 and an annular rotor support member or sleeve 64. In a second embodiment, the first and second means are first and second yieldably resilient (elastomeric) bushings 56, 58 extending circumferentially about the shaft 20 and supporting the stator support member 32 and rotor support members 34, 36 via hub 22 respectively on the outer support housing 12 and shaft structure 14. Here, the hub 22 includes the bushings 58 and the annular rotor support sleeve 64. Also, reinforcing ribs 60 can be added between the rotor support members 34, 36 and the hub 22 to make the rotor assembly able to withstand large axial forces.

The AC electric motors 16, 18 employed in the motor arrangement 10 can be salient pole or cylindrical rotor synchronous induction machines, induction machines, synchronous reluctance machines, or switched reluctance machines. The field or excitation windings could be superconducting using low or high temperature superconductors. The AC windings may also be superconducting if very finely transposed multifilamentory windings are used. All current cooling systems and options are viable for the motor arrangement 10 which include gases, fluids, cryogenics, and heat pipes. Modern laser slot cutting systems could be used to insert the slots progressively as the stator core is circumferentially wound and adhesively bonded between laminations. The axial air gap will allow more space for the excitation winding and the damping winding. Since the space and cooling limitations of radial air gap machines are the limiting factor on machine power density, the axial gap geometry will allow recovery of some of the increased weight and volume of the twin AC motor arrangement 10. Also, complex bearing and large volume structureborne vibration attenuating systems are eliminated.

It is thought that the present invention and many of its attendant advantages will be understood from the foregoing description and it will be apparent that various changes may be made in the form, construction and arrangement thereof without departing from the spirit and scope of the invention or sacrificing all of its material advantages, the form hereinbefore described being merely a preferred or exemplary embodiment thereof.

We claim:

1. A structureborne vibration-compensated motor arrangement, comprising:
   (a) a rotatable shaft structure;
   (b) an outer support housing; and
   (c) a pair of twin AC motors;
   (d) each said motor including an annular stator core structure and an annular stator support member mounting said stator core structure and, in turn, stationarily supported by said outer support housing;
   (e) each said motor further including an annular rotor field structure spaced from said stator core structure and an annular rotor support member mounting said rotor field structure and, in turn, mounted to said shaft structure for rotation therewith such that said rotor field structure rotates relative to said stator core structure;
   (f) said twin AC motors being mounted with said stator core structures located adjacent opposite sides of said stator support member and said rotor field structures located adjacent said respective stator core structures opposite from said stator support member such that said twin AC motors are arranged back-to-back as mirror images of one another for cancelling out axial and radial vibrations of said stator core and rotor field structures at respectively said outer housing and shaft structure.

2. The motor arrangement as recited in claim 1, wherein said rotor field structures are spaced axially from said stator core structures relative to an axis of rotation of said shaft structure.

3. The motor arrangement as recited in claim 1, wherein said rotor field structures are spaced radially from said stator core structures relative to an axis of rotation of said shaft structure.

4. The motor arrangement as recited in claim 1, further comprising:
   first means for yieldably and resiliently mounting said stator support member on said outer support housing so as to isolate torsional vibrations of said stator core structures from said outer support housing; and
   second means for yieldably and resiliently mounting said rotor support members on said shaft structure so as to isolate torsional vibrations of said rotor field structures from said shaft structure.

5. The motor arrangement as recited in claim 4, wherein said first means includes a first plurality of yieldably resilient spring bars supporting said annular stator support member on said outer support housing so as to isolate torsional vibrations of said stator core structures from said outer support housing.

6. The motor arrangement as recited in claim 4, wherein said second means includes a second plurality of yieldably resilient spring bars supporting said annular rotor support members on said shaft structure so as to isolate torsional vibrations of said rotor field structures from said shaft structure.

7. The motor arrangement as recited in claim 4, wherein said first means includes a yieldably resilient first bushing supporting said annular stator support member on said outer support housing so as to isolate torsional vibrations of said stator core structures from said outer support housing.

8. The motor arrangement as recited in claim 4, wherein said second means includes a yieldably resilient second bushing supporting said annular rotor support members on said shaft structure so as to isolate torsional vibrations of said rotor field structures from said shaft structure.

9. A structureborne vibration-compensated motor arrangement, comprising:
   (a) a rotatable shaft structure;
   (b) an outer support housing;
   (c) a pair of twin AC motors;
   (d) each said motor including an annular stator core structure and an annular stator support member mounting said stator core structure and, in turn, stationarily supported by said outer support housing;
   (e) each said motor further including an annular rotor field structure spaced axially from said stator core structure relative to an axis of rotation of said shaft structure and an annular rotor support member mounting said rotor field structure and, in turn, mounted to said shaft structure for rotation therewith such that said rotor field structure rotates relative to said stator core structure;
   (f) said twin AC motors being mounted with said stator core structures located adjacent opposite sides of said stator support member and said rotor field structures located adjacent said respective stator core structures opposite from said stator support member such that said twin AC motors are arranged back-to-back as mirror images of one another for cancelling out axial and radial vibrations of said stator core and rotor field structures at respectively said outer housing and shaft structure;

(g) first means for yieldably and resiliently mounting said stator support member on said outer support housing so as to isolate torsional vibrations of said stator core structures from said outer support housing; and (h) second means for yieldably resiliently mounting said rotor support members on said shaft structure so as to isolate torsional vibrations of said rotor field structures from said shaft structure.

10. The motor arrangement as recited in claim 9, wherein said first means includes a first plurality of yieldably resilient spring bars supporting said annular stator support member on said outer support housing so as to isolate torsional vibrations of said stator core structures from said outer support housing.

11. The motor arrangement as recited in claim 9, wherein said second means includes a second plurality of yieldably resilient spring bars supporting said annular rotor support members on said shaft structure so as to isolate torsional vibrations of said rotor field structures from said shaft structure.

12. The motor arrangement as recited in claim 9, wherein said first means includes a yieldably resilient first bushing supporting said annular stator support member on said outer support housing so as to isolate torsional vibrations of said stator core structures from said outer support housing.

13. The motor arrangement as recited in claim 9, wherein said second means includes a yieldably resilient second bushing supporting said annular rotor support members on said shaft structure so as to isolate torsional vibrations of said rotor field structures from said shaft structure.

14. A structureborne vibration-compensated motor arrangement, comprising:

(a) a rotatable shaft structure;

(b) an outer support housing;

(c) a pair of twin AC motors;

(d) each said motor including an annular stator core structure and an annular stator support member mounting said stator core structure and, in turn, stationarily supported by said outer support casing;

(e) each said motor further including an annular rotor field structure spaced radially from said stator core structure relative to an axis of rotation of said shaft structure and an annular rotor support member mounting said rotor field structure and, in turn, mounted to said shaft structure for rotation therewith such that said rotor field structure rotates relative to said stator core structure;

(f) said twin AC motors being mounted with said stator core structures located adjacent opposite sides of said stator support member and said rotor field structures located adjacent said respective stator core structures opposite from said stator support member such that said twin AC motors are arranged back-to-back as mirror images of one another for cancelling out axial and radial vibrations of said stator core and rotor field structures at respectively said outer housing and shaft structure;

(g) first means for yieldably and resiliently mounting said stator support member on said outer support housing so as to isolate torsional vibrations of said stator core structures from said outer support housing; and (h) second means for yieldably resiliently mounting said rotor support members on said shaft structure so as to isolate torsional vibrations of said rotor field structures from said shaft structure.

15. The motor arrangement as recited in claim 14, wherein said first means includes a first plurality of yieldably resilient spring bars supporting said annular stator support member on said outer support housing so as to isolate torsional vibrations of said stator core structures from said outer support housing.

16. The motor arrangement as recited in claim 14, wherein said second means includes a second plurality of yieldably resilient spring bars supporting said annular rotor support members on said shaft structure so as to isolate torsional vibrations of said rotor field structures from said shaft structure.

17. The motor arrangement as recited in claim 14, wherein said first means includes a yieldably resilient first bushing supporting said annular stator support member on said outer support housing so as to isolate torsional vibrations of said stator core structures from said outer support housing.

18. The motor arrangement as recited in claim 14, wherein said second means includes a yieldably resilient second bushing supporting said annular rotor support members on said shaft structure so as to isolate torsional vibrations of said rotor field structures from said shaft structure.

* * * * *